(12) United States Patent
Curd

(10) Patent No.: US 10,929,549 B1
(45) Date of Patent: Feb. 23, 2021

(54) SYSTEM AND METHOD FOR PROTECTING AUDIO AND VIDEO FILES

(71) Applicant: SCAEVA TECHNOLOGIES, Gilroy, CA (US)

(72) Inventor: Steven Elliott Curd, Gilroy, CA (US)

(73) Assignee: Scaeva Technologies, Inc., Gilroy, CA (US)

( * ) Notice: Subject to any disclaimer, the term of this patent is extended or adjusted under 35 U.S.C. 154(b) by 274 days.

(21) Appl. No.: 15/863,532

(22) Filed: Jan. 5, 2018

(51) Int. Cl.
*H04L 9/00* (2006.01)
*G06F 21/62* (2013.01)
*G06F 21/60* (2013.01)
*G06F 3/0481* (2013.01)
*G06F 3/0484* (2013.01)
*G06F 3/0483* (2013.01)
*G06F 3/0486* (2013.01)

(52) U.S. Cl.
CPC ............ *G06F 21/62* (2013.01); *G06F 3/0483* (2013.01); *G06F 3/0486* (2013.01); *G06F 3/04817* (2013.01); *G06F 3/04842* (2013.01); *G06F 21/602* (2013.01); *G06F 2221/2107* (2013.01)

(58) Field of Classification Search
CPC .................................. H04L 12/00; G06F 9/00
See application file for complete search history.

(56) References Cited

U.S. PATENT DOCUMENTS 6,023,506 A * 2/2000 Ote ...................... G06F 21/6209
380/45
8,341,527 B2 * 12/2012 Gupte ................ H04N 7/17318
715/203

* cited by examiner

*Primary Examiner* — Joseph P Hirl
*Assistant Examiner* — Leynna Truvan
(74) *Attorney, Agent, or Firm* — Raghunath S. Minisandram

(57) ABSTRACT

A system and method to encrypt digital data is disclosed. Digital data is received from a data source by an encryption system. A first data store is designated to store the received digital data. An encryption key is selectively assigned to encrypt the received digital data. A selective portion of the received digital data is encrypted with the assigned encryption key to create encrypted digital data. The encrypted digital data is stored in the first data store.

20 Claims, 8 Drawing Sheets

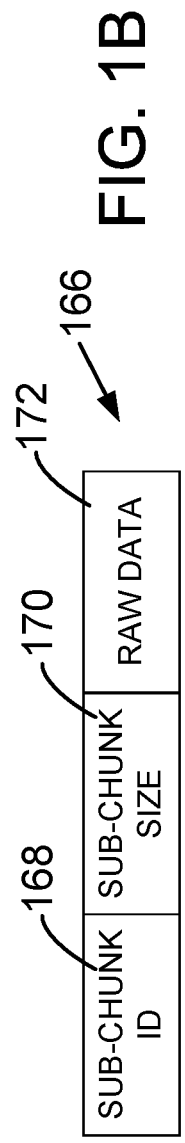
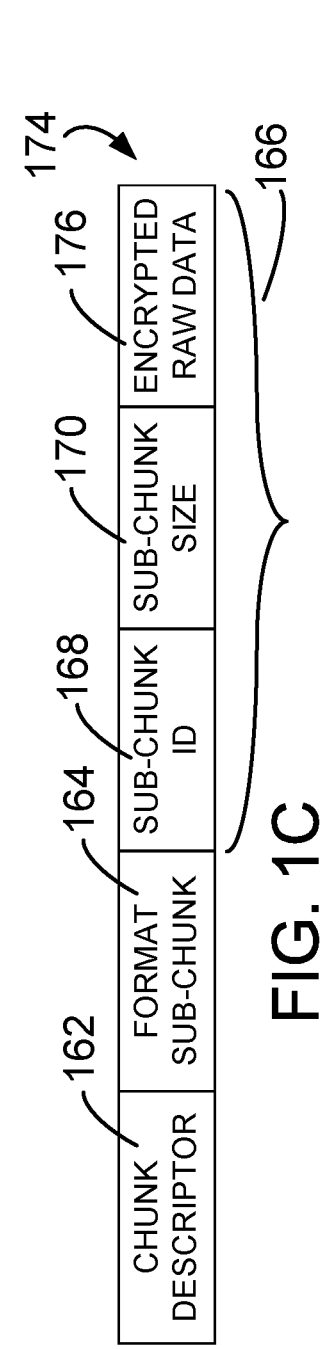
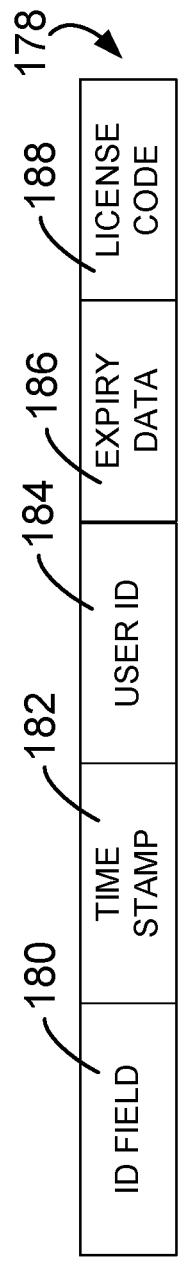
FIG. 1A
FIG. 1B
FIG. 1C
FIG. 1D

SYSTEM AND METHOD FOR PROTECTING AUDIO AND VIDEO FILES

RELATED APPLICATION

None

TECHNICAL FIELD

The present invention relates generally to protecting audio and video files and more specifically, encryption and decryption of audio and video files.

DESCRIPTION OF RELATED ART

Audio and video signals are generally recorded in real time, from a plurality of performing artists. Initially these audio and video signals may be in analog form. These signals in analog form are later converted into digital form. Once these signals are converted into digital form, the digital signals are further processed using programs capable of editing these signals. Additional audio or video digital signals may be added to these digital signals to further enhance the overall effect of the composite signal. Sometimes these activities are referred to as editing and mixing. Eventually, a plurality of these composite signals may be used to generate one or more tracks of signal.

For media systems that include digital audio editing capability, a multimedia system may include a digital audio workstation (DAW). A DAW may include non-linear editing functionality, a user interface displaying a timeline that provides a temporal representation of an audio clip, and the ability to cause audio processing to be performed on an audio signal.

For media systems that include digital film and video editing capability, a multimedia system may include a non-linear video editor (NLE). NLE functionality includes, but not limited to the ability to record and play back one or more video tracks, place video clips into a timeline representing a video composition, and edit clips and other elements in the timeline.

As the value of the composite signal increases, there is a need to protect the information during a storage phase (sometimes referred to as "data at rest"), when the information is stored in a data store. Further, in some examples, there is a need to protect the composite signal during a transmission phase, when the information is transmitted from one location or a source to another location or a destination (sometimes referred to as "data in transit").

It may be beneficial to provide a protection system to protect the digital signals as they are being created, processed and enhanced. With these needs in mind, the current disclosure arises. This brief summary has been provided so that the nature of the disclosure may be understood quickly. A more complete understanding of the disclosure can be obtained by reference to the following detailed description of the various embodiments thereof in connection with the attached drawings.

SUMMARY OF THE INVENTION

In one embodiment, a method to encrypt digital data is disclosed. Digital data is received from a data source by an encryption system. A first data store is designated to store the received digital data. An encryption key is selectively assigned to encrypt the received digital data. A portion of the received digital data is selectively encrypted with the assigned encryption key to create encrypted digital data. The encrypted digital data is stored in the first data store.

In another embodiment, a system to encrypt digital data is disclosed. Digital data is received from a data source by an encryption system. A first data store is designated to store the received digital data. An encryption key is selectively assigned to encrypt the received digital data. A portion of the received digital data is selectively encrypted with the assigned encryption key to create encrypted digital data. The encrypted digital data is stored in the first data store.

This brief summary is provided so that the nature of the disclosure may be understood quickly. A more complete understanding of the disclosure can be obtained by reference to the following detailed description of the preferred embodiments thereof in connection with the attached drawings.

BRIEF DESCRIPTION OF THE DRAWINGS

The foregoing and other features of several embodiments are described with reference to the drawings. In the drawings, the same components have the same reference numerals. The illustrated embodiments are intended to illustrate but not limit the invention. The drawings include the following figures:

FIG. 1A shows an example multimedia file encrypted by the example encryption system, according to one aspect of the present disclosure;

FIG. 1B shows an example data sub-chunk of the multimedia file shown in FIG. 1A, according to one aspect of the present disclosure;

FIG. 1C shows an example modified multimedia file as encrypted by the example encryption system, according to one aspect of the present disclosure;

FIG. 1D shows an example preamble of the example modified multimedia file of FIG. 1C, according to one aspect of the present disclosure;

DETAILED DESCRIPTION

To facilitate an understanding of the adaptive aspects of the present disclosure, an example encryption system will be described. The specific construction and operation of the adaptive aspects of various elements of the example encryption system will be further described with reference to the encryption system.

Figure 1:
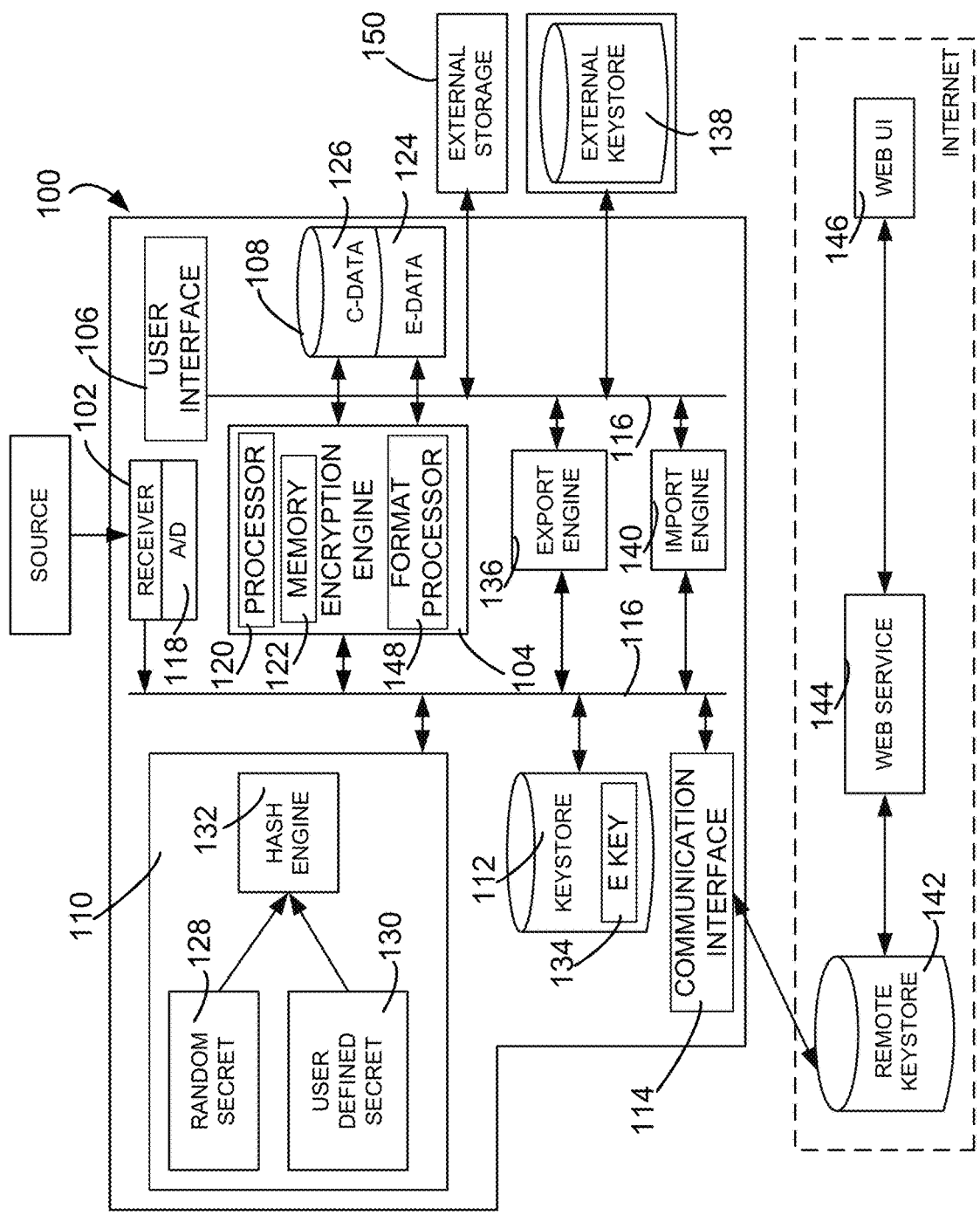
FIG. 1 shows an example encryption system, according to one aspect of the present disclosure.

FIG. 1 shows an example block diagram of an encryption system 100. The encryption system 100 includes a receiver 102, an encryption engine 104, a user interface 106, a data store 108, a key generator 110, a keystore 112, and a communication interface 114, all configured to communicate with each other over a bus 116. The encryption system 100 may be part of a computing system (not shown) with various computing, storage, input and output devices.

The receiver 102 may be configured to receive data from a source, for example, a source external to the encryption system 100. In one example, the receiver 102 may receive analog data. In one example, the receiver 102 may receive digital data.

In one example, the receiver 102 may be configured to convert the received analog data to a digital data, for example, using an analog to digital converter. In one example, the received data may correspond to an audio or visual data stored in a digital form. In one example, the audio or video data may initially be in an analog data form, which has been converted to digital data form, for example, by an analog to digital converter 118.

The encryption engine 104 includes a processor 120 and a memory 122. The processor 120 may be configured to perform various arithmetic and logical computations. The memory 122 may be used to store and retrieve various transient and permanent data to be used by the encryption engine 104. Further functions and features of the encryption engine 104 will be later described with various example implementations described in this disclosure.

User interface 106 may be configured to provide a user access to various functions and features of the encryption system 100. In some examples, the user interface 106 may interact with an input device or an output device, to provide an interface to communicate with the encryption system 100. In one example, the user interface 106 may provide access to various administrative functions of the encryption system 100. In some examples, the user interface 106 may provide access to set up and configuration fields of the encryption system 100. For example, the user interface 106 may provide access to create, manage and assign encryption keys associated with the encryption system 100. In some examples, the user interface 106 may provide access to the encryption system 100 over a web interface.

The data store 108 may be used to store transient and permanent data. In one example, the data store 108 may be used by various other elements of the encryption system 100 to store transient and permanent data. In one example, a portion of the data store 108 may define a first data store 124. In one example, the first data store 124 stores encrypted digital data. Another portion of the data store 108 may define a second data store 126. In one example, the second data store 126 stores clear or un-encrypted digital data.

The key generator 110 is configured to generate one or more encryption keys used by the encryption engine 104 to encrypt clear digital data to generate encrypted digital data. The key generator 100 in one example is configured to receive a random secret 128 and a user defined secret 130. The random secret 128 and the user defined secret 130 is then hashed by the hash engine 132 to generate an encryption key 134.

The generated encryption key 134 is stored in the keystore 112. The keystore 112 may be a data store configured to store the encryption key 134. In one example, the keystore 112 may be internal to the encryption system 100. In some examples, the keystore 112 may be external to the encryption system 100. In one example, an export engine 136 may be configured to selectively transfer the encryption key 134 to an external keystore 138. In some examples, the external keystore 138 may be a portable storage device. In some examples, the external keystore 138 may have one or more access control mechanisms built in, to selectively validate access to the encryption key stored in the external keystore 138. In one example, an import engine 140 may be configured to retrieve stored encryption key 134 from the external keystore 138 and store the retrieved encryption key 134 in the keystore 112. In another example, the encryption key 134 may be obfuscated prior to export, for delivery to a second party for the purposes of enabling the second party to encrypt or decrypt the data utilizing the same encryption key 134.

In one example, a remote keystore 140 may be provided to remotely store or archive the encryption key 134. In one example, the remote keystore 140 may be separate from the encryption engine 100. In one example, the remote keystore 140 may be accessible over the internet. In one example, the communication interface 114 may be selectively used to store the encryption key 134 in the remote keystore 140, and retrieve the encryption key 134 from the remote keystore 140, over the internet. As one skilled in the art appreciates, transmittal and retrieval of the encryption key 134 may be performed over secure communication channels, using one or more secure communication channel protocols. In one example, the encryption key 134 stored in the remote keystore 142 may be accessible and manageable over the internet, using a webservice 144 and a web user interface 146.

In one example, the encryption engine 104 further includes a format processor 148. As one skilled in the art appreciates, the digital data may include format portion and content portion. The format processor 148 is configured to evaluate the digital data and selectively extract the content portion of the digital data. The extracted content portion of the digital data is selectively encrypted to generate the encrypted digital data using the encryption key. In one example, the format processor 148 may selectively modify the format portion of the digital data to include one or more meta data related to the encryption of the content portion of the digital data. This will be further described with reference to FIG. 1A.

In one example, the encryption engine 104 selectively retrieves the stored encryption key and uses the encryption key 134 to generate encrypted digital data. The encrypted digital data is stored in the first data store 124. In another example, the encryption engine 104 retrieves the stored encryption key 134 and stored encrypted digital data, for example, from the first data store 124. The encryption engine 104 then decrypts the encrypted digital data to generate clear digital data. The decrypted digital data is stored in the second data store 126. In one example, the encryption engine 104 may perform encryption using AES encryption standard.

The encrypted digital data stored in the first data store 124 may optionally be transferred to an external data store 150, so that the encrypted digital data may be used by another system. For example, another encryption engine with corresponding encryption key may be able to selectively decrypt the encrypted digital data. In some examples, the clear digital data stored in the second data store 126 may optionally transferred to an external data store 150, so that the clear digital data may be used by another system.

The communication interface 114 is configured to transmit from and receive data to the encryption system 100. For example, the communication interface 114 may transmit the data processed by the encryption system 100 to other systems or components configured to receive the data. In one example, the communication interface 114 may transmit encryption keys utilized by the encryption system 100 to other systems or components configured to receive the encryption keys. In one example, the communication interface 114 may format the data to be transmitted in one or more pre-defined formats so that other systems or components that receive the data understand the data so received. In another example, the Web UI 144 and Web services 142 may be utilized to enable an administrator to determine conditions under which encryption keys are valid, including rendering encryption keys invalid.

Now, referring to FIG. 1A, an example format of a multimedia digital file 160 is described. Multimedia applications require storage and management of a wide variety of data, including bitmaps, audio data, video data, and peripheral device control information. An example file format for a multimedia digital file 160 may be a resource interchange file format (commonly referred to as RIFF). Example of data stored in a RIFF file may be audio/visual interleaved data (.AVI files), waveform data (.WAV files), bitmapped data (.RDI files), MIDI information (.RMI files), color palette (.PAL files), multimedia movie (.RMN files), animated cursor (.ANI files) and a bundle of other RIFF files (.BND files). Example multimedia digital file 160 will now be described with reference to a RIFF file format specification, although the multimedia digital file 160 may conform to other specifications.

The multimedia digital file 160 in general will have a file header 162 portion, a format sub-chunk 164 portion and a data sub-chunk 166 portion. In one example, the file header 162 portion may correspond to a RIFF chunk descriptor. The file header 162 portion may contain a plurality of fields. One of the plurality of fields may be a format field which indicates the type of format of the file. For example, the format field may indicate the file is a .WAV file. The format sub-chunk 164 portion describes the format of the information in the data sub-chunk 166. In this example, as the format of the file is a .WAV file (ie. an audio file), format sub-chunk 164 portion describes the format of the sound information in the data sub-chunk 166. The data sub-chunk 166 may have a plurality of fields. Referring to FIG. 1B, an example data sub-chunk 166 for an audio file is described.

Referring to FIG. 1B, the data sub-chunk 166 is described. For example, the data sub-chunk 166 may have a plurality of fields. For example, one of the field 168 may indicate the identification of the sub-chunk. Another of the field 170 may indicate the size of the sub-chunk stored in the raw data field 172. In this example, as the file is an audio file, the raw data field 172 contains raw sound data. As one skilled in the art appreciates, the raw sound data is in a digital form.

In one example, the format processor 148 of the encryption engine 104 parses the multimedia digital file 160 and identifies various fields of the multimedia digital file 160. Based on the identification of various fields, the format processor 148 selectively extracts the raw data field 172 of the data sub-chunk 166 field of the multimedia digital file 160. The selectively extracted raw data field 172 is then encrypted by the encryption engine 104 to generate encrypted digital data. The raw data field 172 of the multimedia digital file 160 is then replaced by the encrypted digital data to create a modified multimedia digital file 174, with encrypted raw data 176, as shown in FIG. 1C.

As one skilled in the art appreciates, a peripheral device which may be configured to play the modified multimedia digital file 174 will be able to recognize the file type and play the encrypted raw data 176. However, due to the encryption of the raw data, the audio signal generated by the peripheral device is no longer the original audio data stored in the original multimedia digital file 160.

In some examples, there may be multiple raw data fields 172. For example, in a movie file, there may be a plurality of audio raw data fields and a plurality of video raw data fields. In some examples, it may be beneficial to selectively choose an encryption algorithm based on the type of data in the raw data field. For example, based on the size of the raw data contained in the raw data field. As an example, if the raw data field includes audio data, which are typically smaller in size than a video data, it may be beneficial to use different encryption algorithm based on the size of the raw data field. One possible implementation may use a different encryption key size based on the size of the raw data field. As an example, when AES encryption scheme is used, a 128 key AES encryption scheme may be used for video raw data and a 256 key AES encryption scheme may be used for audio raw data.

In one example, one or more blocks of data may be added to the modified multimedia digital file 174 with the encrypted raw data 176, by the encryption engine 104, to indicate one or more attributes of the encrypted raw data 176. In one example, the one or more blocks of data may be added as a preamble to the encrypted raw data 176. In one example, the preamble may be added as a separate sub-chunk field to the modified multimedia digital file 174. FIG. 1D shows an example preamble 178 field that may be appended to the encrypted raw data 176 or added as a separate sub-chunk field to the modified multimedia digital field 174.

Now, referring to FIG. 1D, the preamble 178 may include a plurality of fields. For example, the preamble 178 may include an ID field 180, a time stamp 182 field, a user ID 184 field, an expiration date 186 field and a license code 188 field. The ID field may include one or more characters indicative of the encryption of the raw data field. For example, the ID field 180 may include characters "SCVA". The time stamp 182 field may indicate the date and time last encryption or decryption of the raw data occurred.

The User ID 184 field may indicate the user or the computer that was used to perform the encryption or decryption of the raw data. The expiration date 186 field may indicate an expiration date for the raw data, after which the encryption system will no longer decrypt the encrypted raw data or permit replay of a decrypted raw data. The license code 188 field may be selectively used to determine the applications for which the raw data is authorized for use or licensed for use. In other words, the license code 188 may be used to selectively enable or disable the use of the raw data by one or more applications or users.

Figure 2:
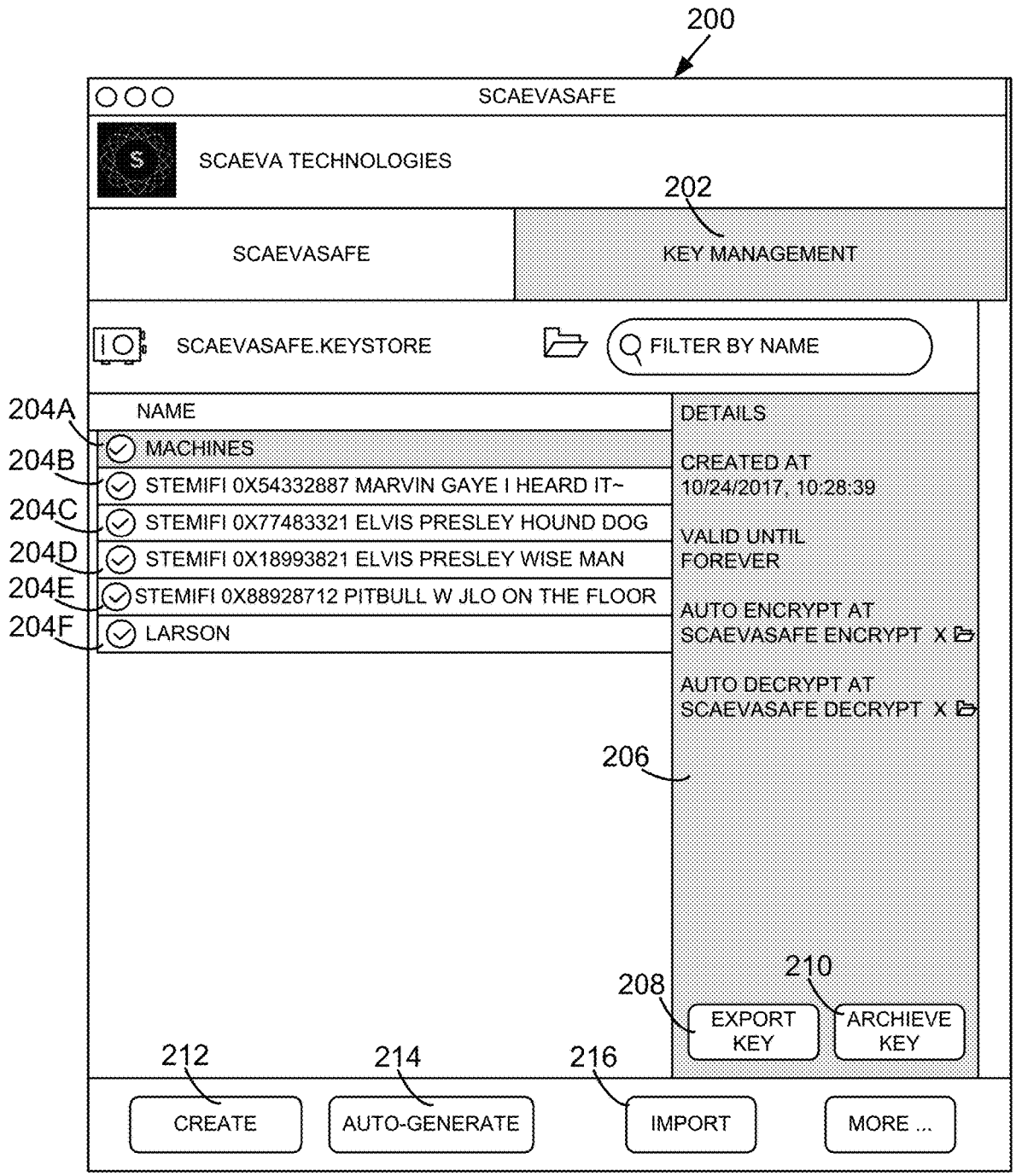
FIG. 2 shows an example user interface for the key management system of the encryption system of FIG. 1, according an aspect of the present disclosure.

Now, referring to FIG. 2, an example user interface for the key management system of the encryption system 100 will be further described. FIG. 2 shows an example user interface 200, as displayed on a display device. The user interface 200 is divided into a plurality of tabs. Some tabs are active tabs and some tabs are information tabs. Active tabs when selected or activated, for example, by clicking on the active tab initiates the performance of one or more actions corresponding to that active tab, by the encryption engine 100. In this example, the Key Management 202 tab is selected.

Various encryption keys 204A-204F stored in the keystore is shown on the display screen. In this example, encryption key 204A is selected. Various attributes of the encryption key 204A is shown in the information tab 206. For example, the encryption key 204A was created on 10/24/2017 at 10:28:39. The encryption key 204A is valid for ever (in other words, there is no set time limit for the validity of the encryption key). Files are auto encrypted at "SCAEVASAFE ENCRYPT" folder. In one example, this corresponds to the first data store. Files are auto decrypted at "SCAEVASFAE DECRYPT" folder. In one example, this corresponds to the second data store.

When the tab "Export Key" 208 is selected, the encryption key 204A is retrieved from the keystore 134 and exported to the external keystore 138. When the tab "Archive Key" 210 is selected, the encryption key 204A is removed from the user interface. The removed encryption key 204A remains within the keystore 134 and optionally within the external keystore 138 for future retrieval. When the tab "Create" 212 is selected, a new encryption key is created, by presenting one or more input screen to receive user defined secret. When the tab "Auto-generate" 214 is selected, a new encryption key is automatically generated by the encryption engine. When the tab "Import" 216 is selected, then encryption key stored in the external keystore 138 is retrieved and stored in the keystore 134.

Figure 3:
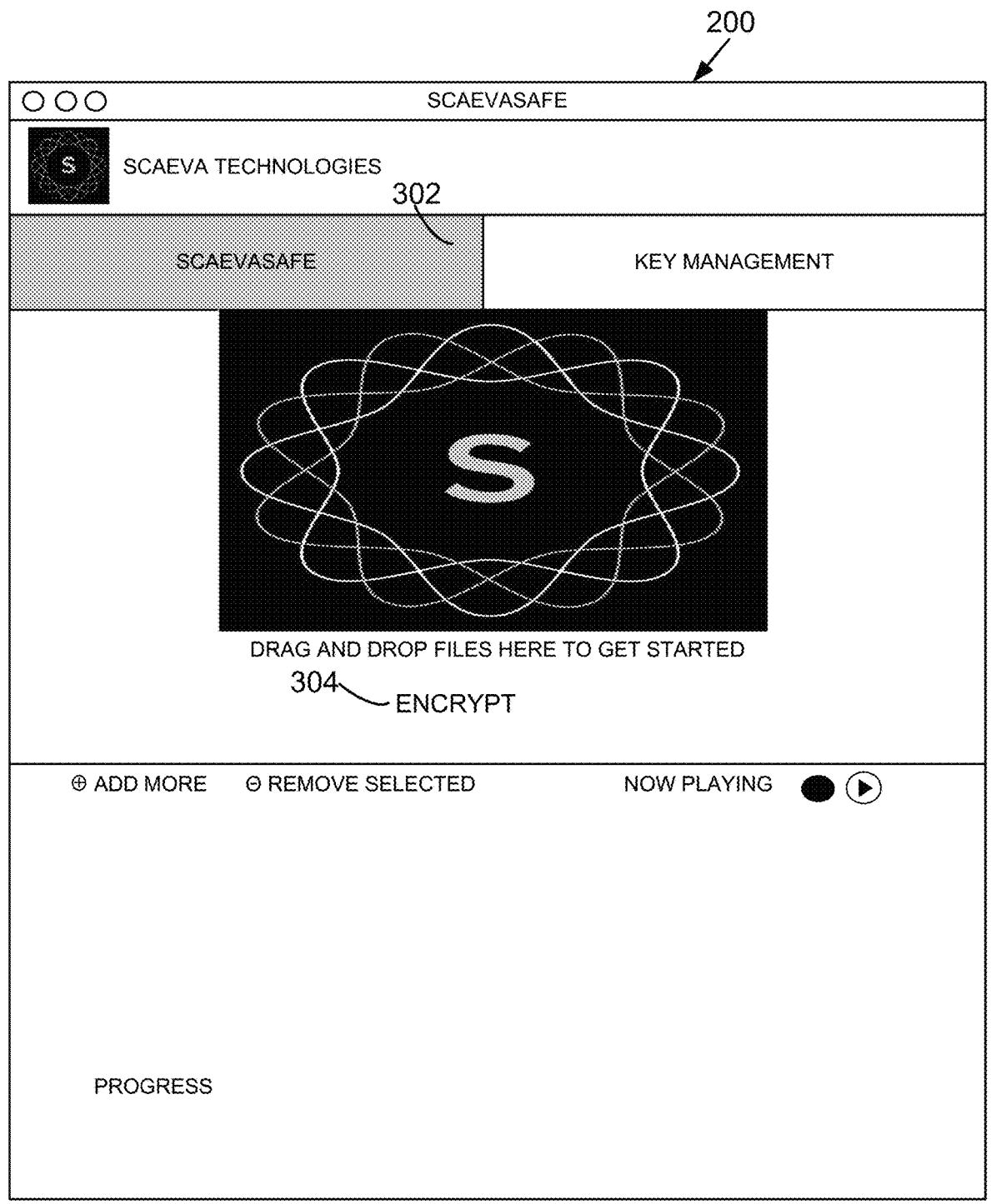
FIG. 3 shows another example user interface showing first data store of the encryption system of FIG. 1, according to an aspect of the present disclosure.

Now, referring to FIG. 3, an example user interface for the encryption engine of the encryption system 100 will be further described. FIG. 3 shows the example user interface 200, as displayed on a display device, with the "ScaevaSAFE" tab 302 selected. In this example, the encryption system 100 encrypts a file, when they are dragged and dropped into the "Encrypt" 304 portion of the user interface. In one example, a plurality of files, or folders including files, are dragged and dropped into the "Encrypt" 304 portion of the user interface. In one example, one or more files or folders stored in the second data store may be dragged and dropped into the "Encrypt" 304 portion of the user interface. Upon dragging and dropping the files into the "Encrypt" 304 portion, each of the files are encrypted using a corresponding encryption key. If an encryption key has not been previously selected, the user is prompted to select a corresponding encryption key.

Figure 4:
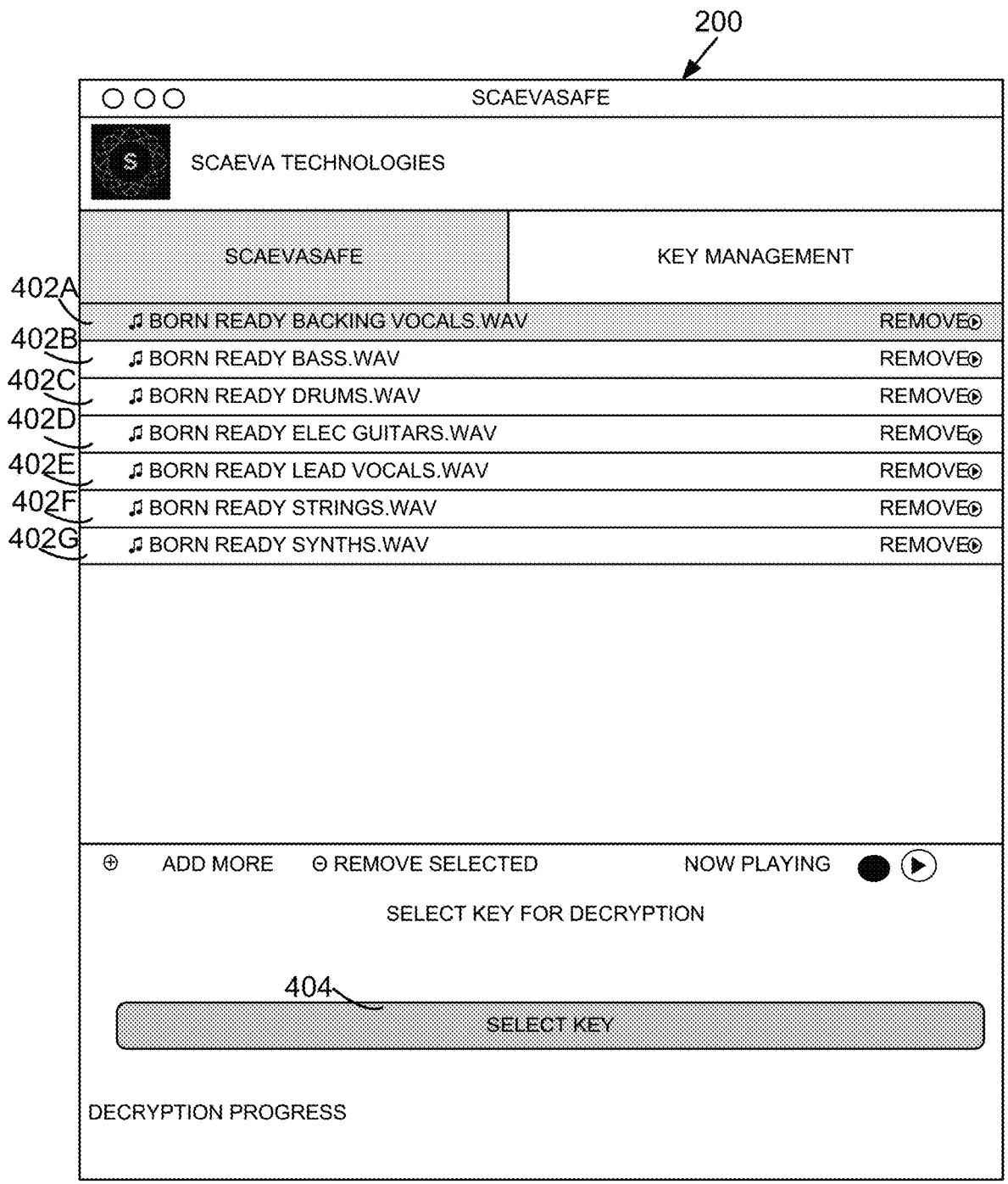
FIG. 4 shows the user interface of FIG. 3, with a plurality of encrypted digital data stored in the first data store, according to an aspect of the present disclosure.

Now, referring to FIG. 4, user interface 200 is shown with the encrypted files 402A-402G. In order to decrypt the encrypted files 402A-402G, corresponding key needs to be selected, using the tab "Select key" 404. When the corresponding key is selected, the encrypted files 402A-402G are decrypted.

Figure 5:
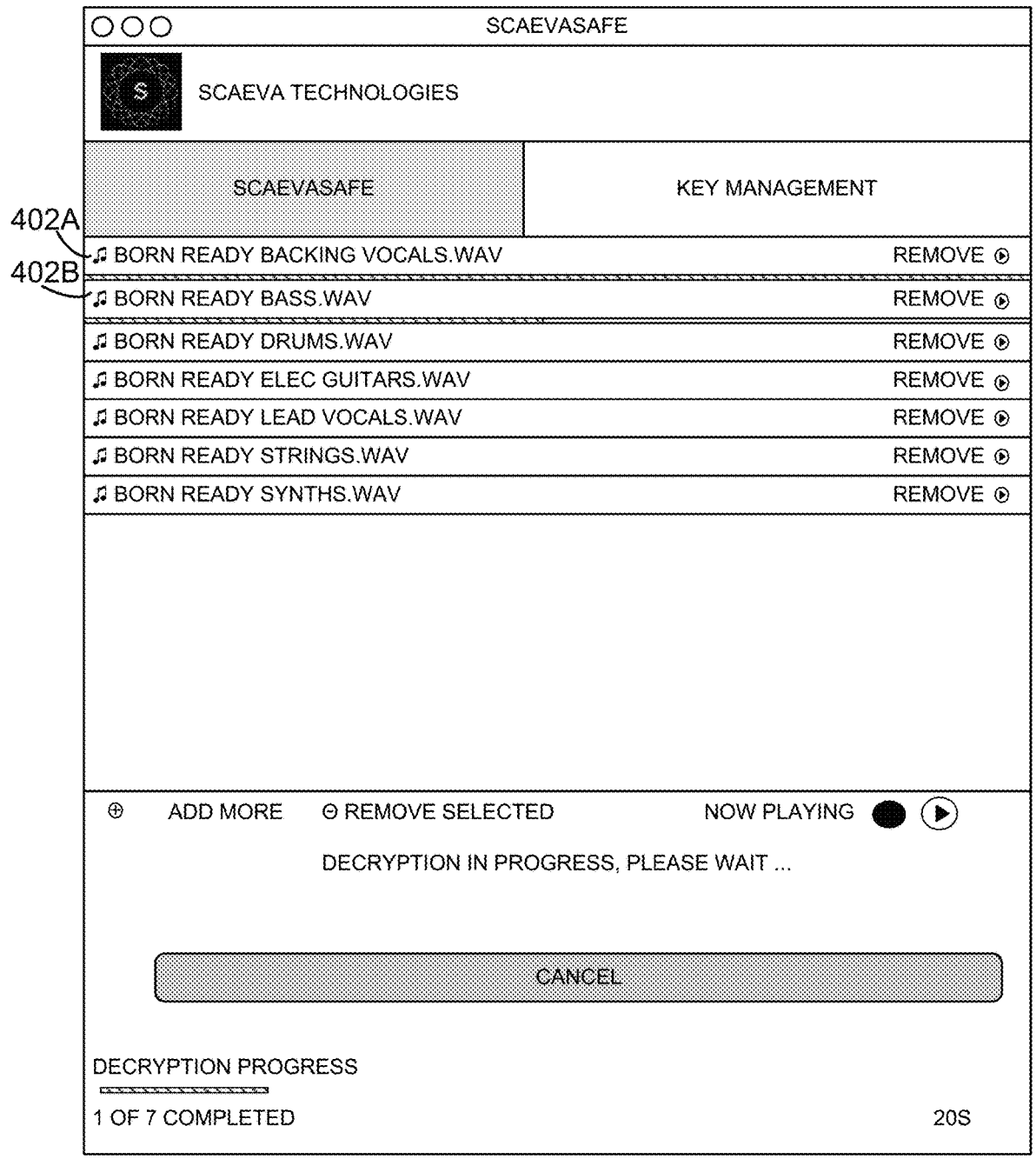
FIG. 5 shows the user interface of FIG. 3, with a subset of the plurality of encrypted digital data in their decrypted form, according to an aspect of the present disclosure.

Now, referring to FIG. 5, user interface 200 is shown with decryption of encrypted files in progress. For example, encrypted file 402A has been decrypted and encrypted file 402B is partially decrypted.

As one skilled in the art appreciates, the encryption system described herein may be advantageously used in a multimedia system. A multimedia system refers to a system for playing time-based digital media, i.e., video and/or audio. The system may in addition have editing capability. For systems that include digital editing capabilities, a multimedia system may include a digital audio workstation and/or a video non-linear editing system.

Digital audio workstation (DAW) is an audio application implemented on a computer, such as a personal computer, mobile device, touch pad, or other device that includes a CPU, memory, display and input devices. DAW functionality includes, but not limited to the ability to record and play back more than one track of audio and mix the channels together.

A DAW may be implemented on a dedicated device connected to a control surface that mediate the user interface. DAWs may also include non-linear editing functionality, a user interface displaying a timeline that provides a temporal representation of an audio clip, and the ability to cause audio processing to be performed on an audio signal. Such processing may be performed either by the same platform that hosts the DAW, or another system such as an audio processing engine that may be provisioned with digital signal processes (DSPs). Various implementations of DAW is described for example, in U.S. Pat. No. 9,514,723 details of which are fully incorporated herein by reference.

For media systems that include digital video editing capability, a multimedia system may include a non-linear video editor (NLE). NLE functionality includes, but is not limited to the ability to record and play back one or more video tracks, place video clips into a timeline representing a video composition, and edit clips and other elements in the timeline.

As used herein, the term "sample" refers to the smallest constituent unit of a media track, media document, or media file that has a distinct temporal location within the media track, document or file. For video media, a media sample corresponds to a video frame. For audio media, a media sample is a single sample of audio. As user herein, a track is a representation of a container for the various elements of source media that an editor places into a timeline of a media editing system. In the context of non-linear video editing applications and digital audio workstations, a track is a software representation that forms part of the graphical user interface. A track may have a media stream input and/or a media stream output.

Figure 6:
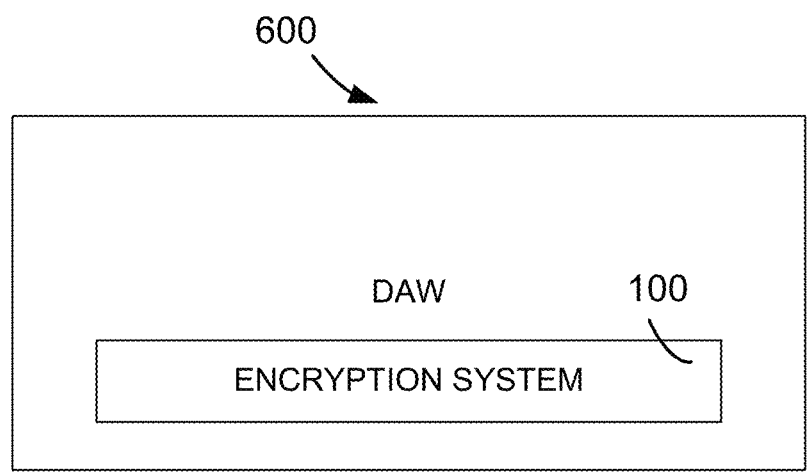
FIG. 6 shows an example digital audio workstation with example encryption system, according to an aspect of the present disclosure.

FIG. 6 shows an example combination of a DAW 600 with the encryption system 100 of this disclosure. In one example, a DAW 600 may be configured to receive a plurality of data received over a plurality of channels. The received data may be analog data or digital data. If the received data is in analog data form, the plurality of analog data is converted to a plurality of received digital data. Each of the plurality of received data is encrypted to create a plurality of encrypted received data. For example, the encryption system described herein may be used to generate a plurality of encrypted received data. In one example, the encryption system described herein may be part of a DAW. In one example, the encryption system described herein may be a separate from the DAW, but configured to be selectively accessible by the DAW.

In one example, the encryption engine 100 retrieves the one or more plurality of encrypted data. The encryption engine decrypts the one or more of the encrypted data. The decrypted data is selectively modified by the DAW. Selectively modified retrieved plurality of decrypted data is re-encrypted by the encryption engine. The modified plurality of encrypted data is stored in the first data store.

In one example, the DAW selectively combines one or more of the modified plurality of encrypted data to create a composite data. In some examples, the composite data may correspond to one or more stems. In some examples, the composite data may correspond to one or more tracks of audio or video signal.

Figure 7:
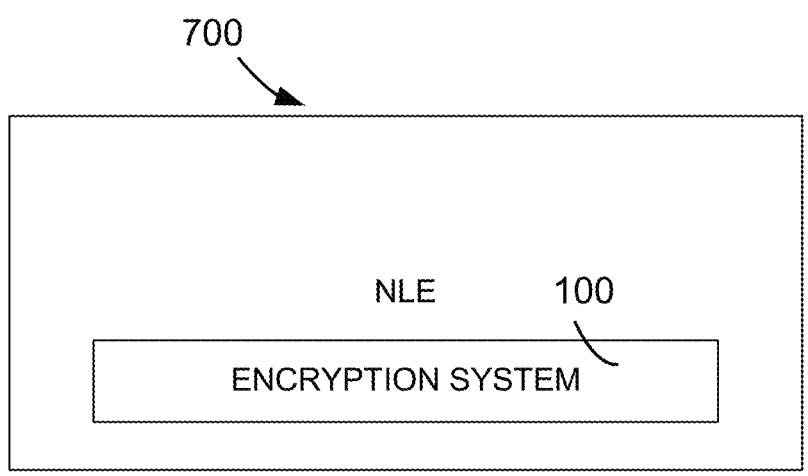
FIG. 7 shows an example non-linear digital video workstation with example encryption system, according to an aspect of the present disclosure.

FIG. 7 shows an example combination of an NLE 700 with the encryption system 100 of this disclosure. In one example, an NLE 700 may be configured to receive a plurality of digital film or video data. Each of the plurality of received data is encrypted to create a plurality of encrypted received data. For example, the encryption system described herein may be used to generate a plurality of encrypted received data. In one example, the encryption system described herein may be part of the NLE. In one example, the encryption system described herein may be a separate from the NLE, but configured to be selectively accessible by the NLE.

In one example, the encryption engine 100 retrieves the one or more plurality of encrypted data. The encryption engine decrypts the one or more of the encrypted data. The decrypted data is selectively modified by the NLE. Selectively modified retrieved plurality of decrypted data is re-encrypted by the encryption engine. The modified plurality of encrypted data is stored in the first data store.

Figure 8:
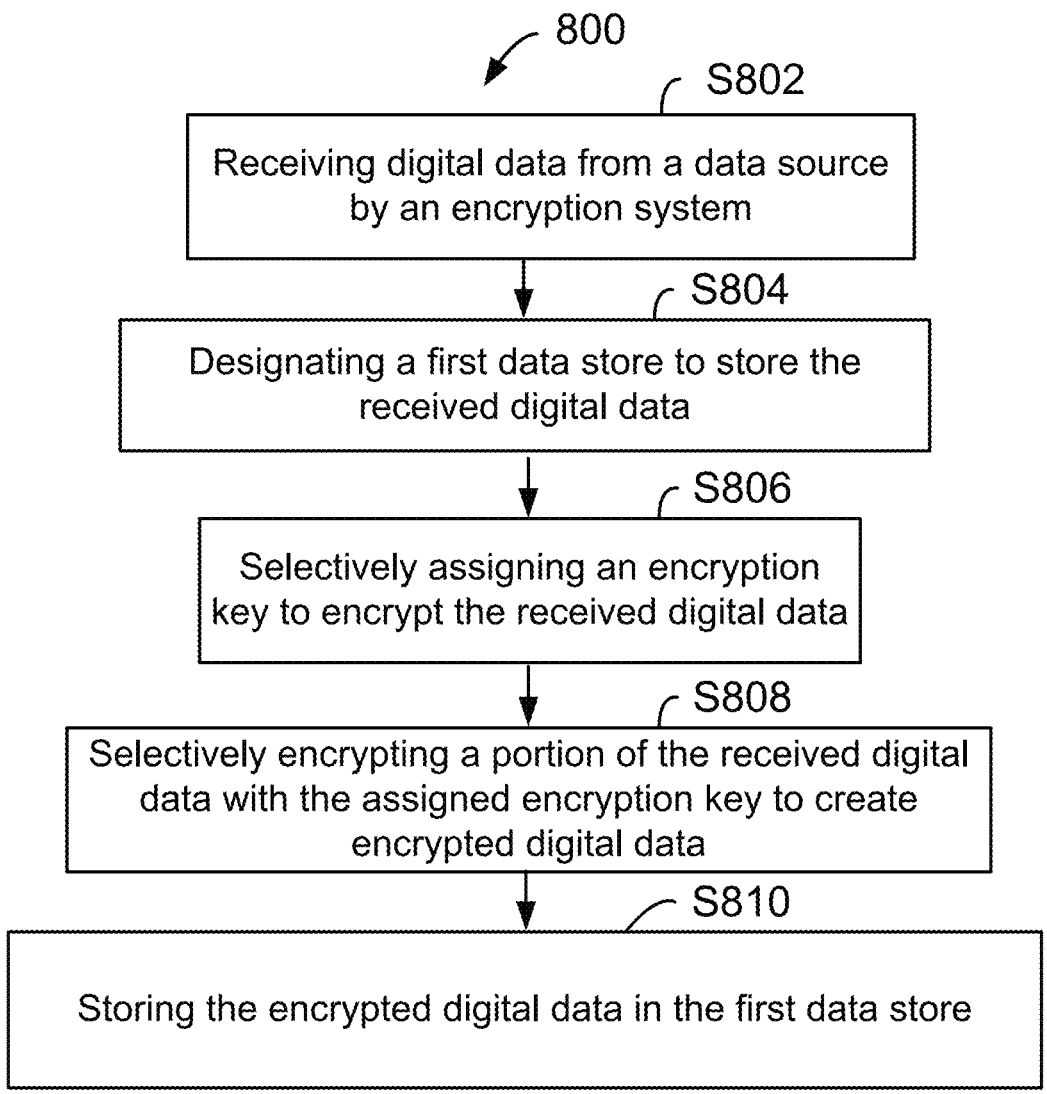
FIG. 8 shows an example flow diagram to process received digital data, according to an aspect of the present disclosure.

Now, referring to FIG. 8, an example flow diagram 800 is described. In block S802, the digital data from a data source is received by the encryption system. In one example, the encryption system 100 may receive a multimedia file as previously described with reference to FIGS. 1A and 1B. In one example, the multimedia file may be an audio file received from a digital audio workstation. In one example, the multimedia file may be a video file received from a non-linear video editor. In one example, the multimedia file may conform to RIFF specification.

In block S804, a first data store is designated to store the received digital data. For example, the first data store 124 may be designated to store the received digital data.

In block S806, an encryption key is selectively assigned to encrypt the received digital data. For example, the encryption key 134 stored in the keystore 112 may be selectively assigned. A user interface as described with reference to FIG. 2 may be used to selectively assign an encryption key.

In block S808, a portion of the received digital data is selectively encrypted using the assigned encryption key to create encrypted digital data. For example, as previously described, the format processor 148 of the encryption engine 104 may selectively parse the received digital data and identify raw data portion of the received data. The raw data portion of the received data is then encrypted by the encryption engine to create an encrypted raw data. The raw data of the received digital data is replaced by the encrypted raw data. In one example, a preamble field with various attributes are added to the encrypted raw data, as previously described with reference to FIG. 1D.

In block S810, the encrypted digital data is stored in the first data store. For example, the received digital data with encrypted raw data is stored in the first data store.

The embodiments disclosed herein can be implemented through at least one software program running on at least one hardware device and performing various functions of the security appliance. Various functions of the security appliance as described herein can be at least one of a hardware device, or a combination of hardware device and software module.

The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means, and at least one software means. The method embodiments described herein could be implemented in pure hardware or partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While embodiments of the present invention are described above with respect to what is currently considered its preferred embodiments, it is to be understood that the invention is not limited to that described above. To the contrary, the invention is intended to cover various modifications and equivalent arrangements within the spirit and scope of the appended claims.

What is claimed is:

1. A method to encrypt digital data, comprising:
receiving multimedia digital data from a data source by an encryption system, wherein the multimedia digital data includes a digital audio data portion;
designating a first data store to store the received multimedia digital data;
selectively assigning an encryption key to encrypt the digital audio data portion of the received multimedia digital data;
selectively encrypting the digital audio data portion of the received multimedia digital data with the assigned encryption key to create encrypted digital data;
creating a modified multimedia digital data by replacing the digital audio data portion of the received multimedia digital data with the encrypted digital data;
storing the modified multimedia digital data with the encrypted digital data in the first data store;
receiving a plurality of multimedia digital data, each with a digital audio data portion over a plurality of input channels;
encrypting the digital audio data portion of each of the plurality of received multimedia digital data to create a plurality of encrypted digital data;
retrieving one or more of the plurality of encrypted digital data;
decrypting one or more of the digital audio portion of the retrieved plurality of encrypted digital data;
selectively modifying the retrieved plurality of decrypted digital audio data portion of the digital data;
re-encrypting the selectively modified digital audio data portion of the retrieved plurality of decrypted digital data to generate a modified plurality of encrypted digital data; and
storing the modified plurality of encrypted digital data in the first data store.

2. The method of claim 1, further including:
retrieving the modified multimedia digital data with the encrypted digital data from the first data store;
decrypting the encrypted digital data portion of the modified multimedia digital data; and
storing the decrypted digital data in a second data store.

3. The method of claim 1, further including
providing a user interface displaying an icon indicative of the first data store;

selectively dragging another icon indicative of the multimedia digital data and dropping into the icon indicative of the first data store; and initiating encryption of the digital audio data portion of the multimedia digital data for storage in the first data store upon dropping.

4. The method of claim 3, further including providing a user interface displaying an icon indicative of the second data store;

selectively dragging another icon indicative of the encrypted digital data from the first data store to the icon indicative of the second data store;

selectively decrypting the encrypted digital audio data portion of the modified multimedia digital data; and storing the decrypted digital data in the second data store.

5. The method of claim 1, further including, selectively combining one or more of the modified audio data portion of the plurality of decrypted digital data to create a composite digital data.

6. The method of claim 1, wherein selectively encrypting the digital audio portion of the received multimedia digital data further including parsing the received multimedia digital data to identify the digital audio data portion of the received multimedia digital data and encrypting the identified digital audio data portion of the received multimedia digital data to create an encrypted digital audio data portion and replacing the digital audio data portion in the multimedia digital data with the encrypted digital audio data portion.

7. The method of claim 1, wherein a digital audio workstation selectively modifies the retrieved plurality of decrypted digital audio data.

8. The method of claim 1, wherein the plurality of decrypted digital data includes a digital video data portion and a non-linear video editing workstation selectively modifies the video data portion of the retrieved plurality of decrypted digital data.

9. The method of claim 8, wherein the digital audio portion is encrypted with a first encryption key and the digital video portion is encrypted with a second encryption key, wherein the length of the first encryption key is smaller than the second encryption key.

10. The method of claim 1, wherein the multimedia digital data conforms to a resource interchange file format.

11. A system to encrypt digital data, comprising:

an encryption system configured to receive multimedia digital data from a data source, wherein the multimedia digital data includes a digital audio data portion;

a first data store designated to store the received multimedia digital data;

an encryption key is selectively assigned to encrypt the received multimedia digital data;

the digital audio data portion of the received multimedia digital data is selectively encrypted with the assigned encryption key by the encryption system to create an encrypted digital data;

a modified multimedia digital data is created by replacing the digital audio data portion of the received multimedia digital data with the encrypted digital data;

the modified multimedia digital data with encrypted digital data is stored in the first data store;

a plurality of input channels configured to receive a plurality of multimedia digital data, each with a digital audio data portion;

the digital audio data portion of each of the plurality of received multimedia digital data is encrypted to create a plurality of encrypted digital data;

one or more of the plurality of encrypted digital data is retrieved;

one or more of the digital audio portion of the retrieved plurality of encrypted digital data is decrypted;

the retrieved plurality of decrypted digital audio data portion of the digital data is selectively modified;

the selectively modified digital audio data portion of the retrieved plurality of decrypted digital data is re-encrypted to generate a modified plurality of encrypted digital data; and the modified plurality of encrypted digital data is stored in the first data store.

12. The system of claim 11, wherein, the modified multimedia digital data with the encrypted digital data is retrieved from the first data store;

the encrypted digital audio data portion of the modified multimedia digital data is decrypted; and the decrypted digital data is stored in a second data store.

13. The system of claim 11, wherein, a user interface is provided to display an icon indicative of the first data store;

another icon indicative of the multimedia digital data is selectively dragged and dropped into the icon indicative of the first data store; and encryption of the digital audio data portion of the multimedia digital data is initiated for storage in the first data store upon dropping.

14. The system of claim 13, wherein, a user interface is provided to display an icon indicative of the second data store;

another icon indicative of the encrypted digital data is selectively dragged from the first data store to the icon indicative of the second data store;

the encrypted digital audio data portion of the modified multimedia digital data is selectively decrypted; and the decrypted digital data is stored in the second data store.

15. The system of claim 11, wherein, one or more of the modified audio data portion of the plurality of decrypted digital data is selectively combined to create a composite digital data.

16. The system of claim 11, wherein the received multimedia digital data is parsed to identify digital audio data portion of the received multimedia digital data and the digital audio data portion of the received multimedia digital data is encrypted to create an encrypted digital audio data and the digital audio data portion of the multimedia digital data is replaced with the encrypted digital audio data.

17. The system of claim 11, wherein a digital audio workstation selectively modifies the retrieved plurality of decrypted digital audio data.

18. The system of claim 11, wherein the plurality of decrypted digital data includes a digital video data portion and a non-linear video editing workstation selectively modifies the video data portion of the retrieved plurality of decrypted digital data.

19. The system of claim 18, wherein the digital audio portion is encrypted with a first encryption key and the digital video portion is encrypted with a second encryption key, wherein the length of the first encryption key is smaller than the second encryption key.

20. The system of claim 11, wherein the multimedia digital data conforms to a resource interchange file format.

* * * * *